United States Patent
Saito et al.

(10) Patent No.: US 8,880,570 B2
(45) Date of Patent: Nov. 4, 2014

(54) INFORMATION PROCESSING SYSTEM, INFORMATION PROCESSING APPARATUS, INFORMATION PROCESSING METHOD, AND COMPUTER READABLE MEDIUM

(75) Inventors: Takahiro Saito, Kanagawa (JP); Yoko Kurihara, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 120 days.

(21) Appl. No.: 13/361,513

(22) Filed: Jan. 30, 2012

(65) Prior Publication Data

US 2013/0041926 A1  Feb. 14, 2013

(30) Foreign Application Priority Data

Aug. 12, 2011  (JP) ................... 2011-176612

(51) Int. Cl.
*G06F 17/30* (2006.01)
*G06F 3/12* (2006.01)
*H04L 29/08* (2006.01)

(52) U.S. Cl.
CPC .. *G06F 3/12* (2013.01); *H04L 67/28* (2013.01)
USPC .......................................... 707/821; 707/822

(58) Field of Classification Search
CPC .............................................. G06F 17/30091
See application file for complete search history.

(56) References Cited

U.S. PATENT DOCUMENTS

2002/0024536 A1* 2/2002 Kahan et al. ................. 345/745
2005/0096069 A1* 5/2005 Lee ............................. 455/456.5

FOREIGN PATENT DOCUMENTS

JP  10-275117 A  10/1998

* cited by examiner

*Primary Examiner* — Hung Q Pham
(74) *Attorney, Agent, or Firm* — Sughrue Mion, PLLC

(57) ABSTRACT

An information processing system includes a first information processing apparatus, a second information processing apparatus, and a third information processing apparatus. The first information processing apparatus includes a collecting unit that collects information, a generating unit that generates first and second deleting conditions, an adding unit that adds the first and second deleting conditions to the information, and a first transmitting unit that transmits the information including the first and second deleting conditions added thereto. The second information processing apparatus includes a first receiving unit that receives the transmitted information, a first storing unit that stores the received information, a second transmitting unit that transmits the stored information, and a first deleting unit that deletes the information. The third information processing apparatus includes a second receiving unit that receives the transmitted information, a second storing unit that stores the received information, and a second deleting unit that deletes the information.

5 Claims, 7 Drawing Sheets

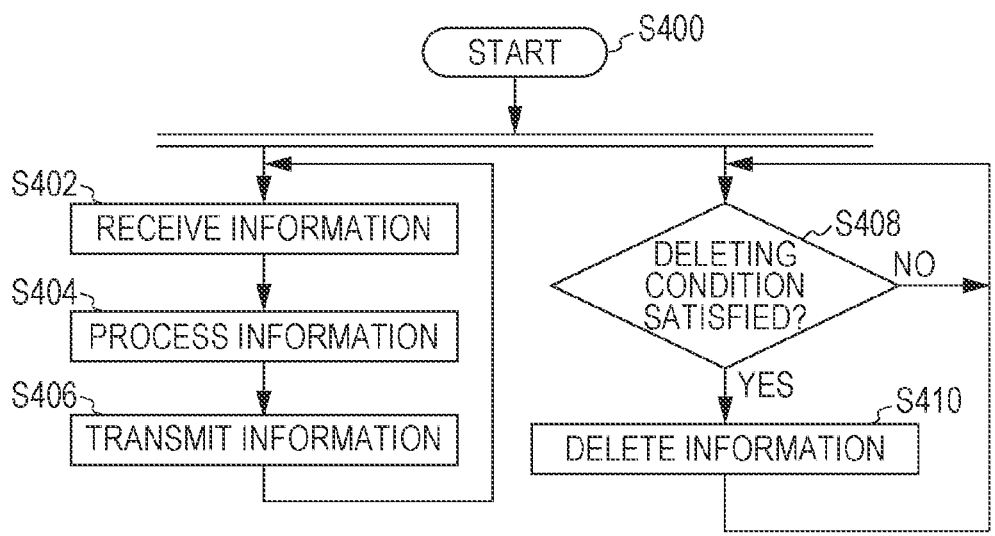
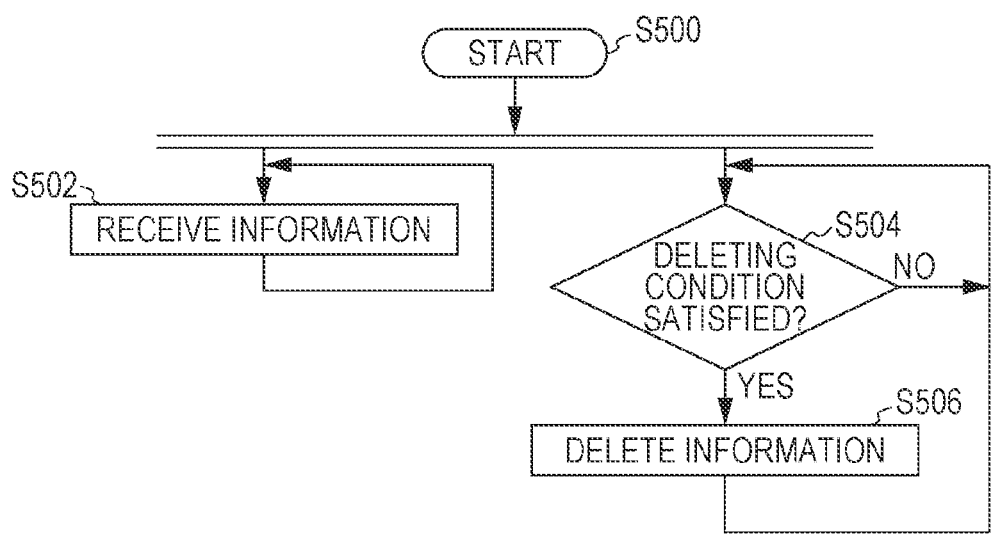

FIG. 7

| (1) INFORMATION TYPE | CUSTOMER VISIT INFORMATION | INSTRUCTION MANUAL | CONFIDENTIAL INFORMATION | PERIODIC INFORMATION | TIME-LIMITED INFORMATION | MANUAL REGISTERED INFORMATION |
|---|---|---|---|---|---|---|
| (2) DELETING CONDITION FOR INFORMATION DISTRIBUTING APPARATUS | AFTER ARRIVAL OF VISIT REPORT | UNTIL NEXT VERSION | AFTER TRANSFER TO TERMINAL | ONE MONTH | 12.1.2011 | UNTIL RECEPTION OF DELETING INSTRUCTION |
| (3) DELETING CONDITION FOR INFORMATION PROCESSING TERMINAL | AFTER TRANSMISSION OF VISIT REPORT | SAME PERIOD AS INFORMATION DISTRIBUTING APPARATUS | AFTER DISPLAYED ONCE | ONE MONTH | 12.1.2011 | SAME PERIOD AS INFORMATION DISTRIBUTING APPARATUS |

INFORMATION PROCESSING SYSTEM, INFORMATION PROCESSING APPARATUS, INFORMATION PROCESSING METHOD, AND COMPUTER READABLE MEDIUM

CROSS-REFERENCE TO RELATED APPLICATIONS

This application is based on and claims priority under 35 USC 119 from Japanese Patent Application No. 2011-176612 filed Aug. 12, 2011.

BACKGROUND (i) Technical Field

The present invention relates to an information processing system, an information processing apparatus, an information processing method, and a computer readable medium.

(ii) Related Art

Technologies relating to deletion of information are available.

SUMMARY

According to an aspect of the invention, there is provided an information processing system including a first information processing apparatus, a second information processing apparatus, and a third information processing apparatus. The first information processing apparatus includes a collecting unit that collects information to be transmitted to the third information processing apparatus via the second information processing apparatus, a generating unit that generates, in accordance with the type of the information collected by the collecting unit, a first deleting condition, which is a condition under which the information is deleted by the second information processing apparatus, and a second deleting condition, which is a condition under which the information is deleted by the third information processing apparatus, an adding unit that adds the first deleting condition and the second deleting condition, which are generated by the generating unit, to the information collected by the collecting unit, and a first transmitting unit that transmits the information including the first deleting condition and the second deleting condition added thereto by the adding unit to the second information processing apparatus. The second information processing apparatus includes a first receiving unit that receives the information transmitted by the first transmitting unit of the first information processing apparatus, a first storing unit that stores the information received by the first receiving unit, a second transmitting unit that transmits the information stored in the first storing unit to the third information processing apparatus, and a first deleting unit that deletes the information from the first storing unit on the basis of the first deleting condition included in the information stored in the first storing unit. The third information processing apparatus includes a second receiving unit that receives the information transmitted by the second transmitting unit of the second information processing apparatus, a second storing unit that stores the information received by the second receiving unit, and a second deleting unit that deletes the information from the second storing unit on the basis of the second deleting condition included in the information stored in the second storing unit.

BRIEF DESCRIPTION OF THE DRAWINGS

Exemplary embodiments of the present invention will be described in detail based on the following figures, wherein:

FIG. 4 is a flowchart illustrating an example of a process performed by an information distributing apparatus;

FIG. 5 is a flowchart illustrating an example of a process performed by an information processing terminal;

FIG. 7 is an explanatory diagram illustrating an example of the data structure of a deleting condition table.

DETAILED DESCRIPTION

Hereinafter, exemplary embodiments of the invention will be explained below with reference to the drawings.

Figure 1:
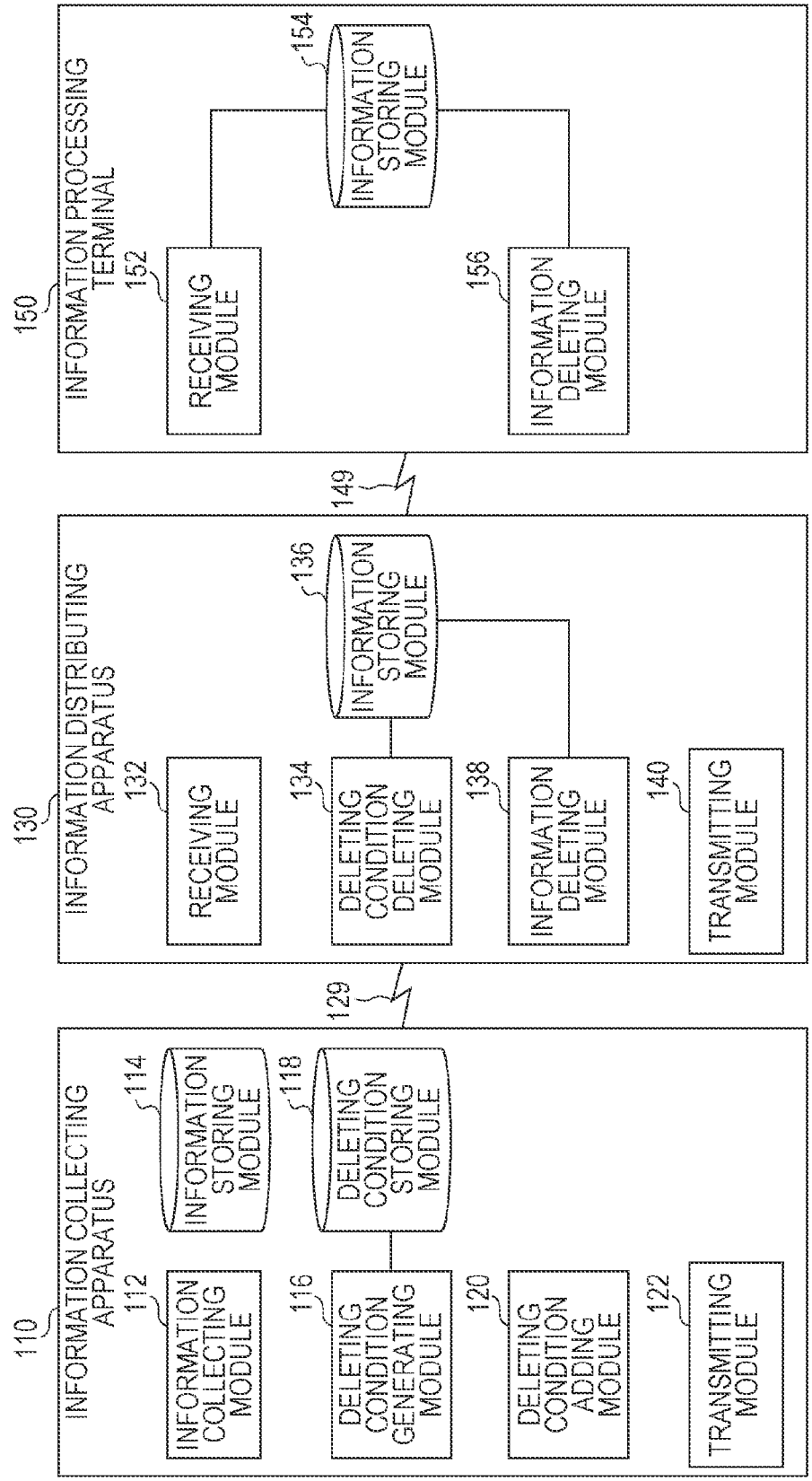
FIG. 1 is a schematic diagram illustrating an example of the module configuration according to an exemplary embodiment.

FIG. 1 is a schematic diagram illustrating an example of the module configuration according to an exemplary embodiment.

The term "module" generally represents a component such as software (a computer program), hardware, or the like, which can be logically separated. Thus, modules in exemplary embodiments represent modules in a hardware configuration as well as modules in a computer program. Therefore, the exemplary embodiments also provide explanations of computer programs for causing the components to function as modules (including a program causing a computer to execute various procedures, a program causing a computer to function as various units, and a program causing a computer to implement various functions), systems, and methods. For the sake of a clear explanation, the terms "store" and "cause something to store" and other equivalent expressions are used. In a case where an exemplary embodiment concerns a computer program, these terms and expressions mean "causing a storing device to store" or "controlling a storing device to store". In addition, a module may correspond to a function in a one-to-one relationship. However, for implementation, a single module may be implemented by a single program, plural modules may be implemented by a single program, or a single module may be implemented by plural programs. Furthermore, plural modules may be executed by a single computer or a single module may be executed by plural computers in a distributed or parallel environment. One module may include another module. Hereinafter, the term "connection" means logical connection (exchange of data, instruction, cross-reference between data, and the like) as well as physical connection. The term "predetermined" means set before a target process is performed. Being "predetermined" means not only being set before processing in an exemplary embodiment starts but also being set even after the processing in the exemplary embodiment starts, in accordance with the condition and state at that time or in accordance with the condition and state of a period until that time, as long as before the target process is performed.

A "system" or an "apparatus" may be implemented by a single computer, hardware, apparatus, or the like as well as by plural computers, hardware, apparatuses, or the like connected using a communication unit such as a network (including communication connection in a one-to-one correspondence). The term "apparatus" is used as a synonym for the term "system". Obviously, the term "system" does not include merely a social "mechanism" (social system), which is an artificial arrangement.

For each process in a module or for individual processes in a module performing plural processes, target information is read from a storing device and the result of the process is written to the storing device after the process is performed. Thus, the explanation of reading from the storing device before the process is performed or the explanation of writing to the storing device after the process is performed may be omitted. The storing device may be a hard disk, a random-access memory (RAM), an external storage medium, a storing device using a communication line, a register inside a central processing unit (CPU), or the like.

An information processing system according to this exemplary embodiment includes an information collecting apparatus 110, an information distributing apparatus 130, and an information processing terminal 150, as illustrated in FIG. 1. In the information processing system, information is transmitted from the information collecting apparatus 110 to the information processing terminal 150 via the information distributing apparatus 130.

The information collecting apparatus 110 includes an information collecting module 112, an information storing module 114, a deleting condition generating module 116, a deleting condition storing module 118, a deleting condition adding module 120, and a transmitting module 122. The information collecting apparatus 110 is connected to the information distributing apparatus 130 via a communication line 129.

The information collecting module 112 collects information to be transmitted to the information processing terminal 150 via the information distributing apparatus 130. The information to be collected by the information collecting module 112 may be used by an owner of the information processing terminal 150. For example, in the case where the owner of the information processing terminal 150 is an engineer who repairs a machine (a personal computer (PC), a copying machine, a facsimile machine, a scanner, a printer, a compound machine (an image processing apparatus having two or more of a scanner, a printer, a copying machine, a facsimile machine, etc.), or the like) located at customer premises, information relating to the machine to be repaired corresponds to the information to be collected by the information collecting module 112. More specifically, the instruction manual for the machine to be repaired, the repair history, the map of the company at which the machine is located, etc. correspond to the information to be collected by the information collecting module 112. Such information is collected mainly from a database etc. located in the company. However, such information may include information located outside the company. The database etc. located in the company is connected to the information collecting apparatus 110 via an intranet (an intra-company network established using a standard technology in the Internet, which is typified by a communication protocol TCP/IP). In the case where the intranet is connected to an external network such as the Internet, a firewall is often established between the intranet and the Internet. In this case, for connection with the external Internet, in terms of security and the like, use service (port number) and a computer to be connected are restricted. In this case, although the information collecting apparatus 110 is located inside the firewall, the information distributing apparatus 130 and the information processing terminal 150 are located outside the firewall. Therefore, the firewall is included in the communication line 129.

Information is collected at a timing such as polling, event notification, or the like. Information may be collected by each person in charge who uses the information.

The information storing module 114 stores the information collected by the information collecting module 112. The information storing module 114 may be accessed by the deleting condition generating module 116, the deleting condition adding module 120, and the transmitting module 122.

The deleting condition generating module 116 is connected to the deleting condition storing module 118. The deleting condition generating module 116 generates, in accordance with the type of the information collected by the information collecting module 112 (information stored in the information storing module 114), a first deleting condition, which is the condition under which the information is deleted by the information distributing apparatus 130, and a second deleting condition, which is the condition under which the information is deleted by the information processing terminal 150.

The deleting condition storing module 118 is connected to the deleting condition generating module 116. In accordance with the type of information, a first deleting condition, which is the condition under which the information is deleted by the information distributing apparatus 130, and a second deleting condition, which is the condition under which the information is deleted by the information processing terminal 150, are stored in the deleting condition storing module 118. For example, the deleting condition storing module 118 stores a deleting condition table 700. FIG. 7 is an explanatory diagram illustrating an example of the data structure of the deleting condition table 700. In the deleting condition table 700, a customer visit information section 710, an instruction manual section 720, a confidential information section 730, a periodic information section 740, a time-limited information section 750, and a manual registered information section 760 each include three types of information, a field 702 of an information type 702, a field 704 of a deleting condition for an information distributing apparatus, and a field 706 of a deleting condition for an information processing terminal. For example, the customer visit information section 710 includes information "after the arrival of a visit report" as a first deleting condition and information "after the transmission of a visit report" as a second deleting condition. For example, the instruction manual section 720 includes information "until the reception (or transmission) of the next version" as a first deleting condition and information the same period as the information distributing apparatus 130" as a second deleting information. For example, the confidential information section 730 includes information "after the transfer to the information processing terminal 150" as a first deleting condition and information "after the information is displayed once" as a second deleting condition. For example, the periodic information section 740 includes information "one month after transfer" as a first deleting condition and information "one month after reception" as a second deleting condition. For example, the time-limited information section 750 includes information "12. 1. 2011" as a first deleting condition and information "12. 1. 2011" as a second deleting condition. The manual registered information section 760 includes information "until the reception of a deleting instruction" as a first deleting condition and information "the same period as the information distributing apparatus 130" as a second deleting condition. The deleting condition table 700 may store conditions other than the conditions illustrated in FIG. 7 or may selectively use one or more conditions illustrated in FIG. 7.

Regarding the determination as to which section in the field 702 of the information type in the deleting condition table 700 corresponds to the information collected by the information collecting module 112, the determination may be made on the basis of a table in which the information and the type of the information are associated with each other, the type of information may be added to each piece of information, or the type of information may be determined on the basis of the name of a database (DB) or the like in which the information is stored.

The deleting condition adding module 120 adds the first deleting condition and the second deleting condition generated by the deleting condition generating module 116 to the information collected by the information collecting module 112.

The transmitting module 122 transmits the information including the first deleting condition and the second deleting condition added thereto by the deleting condition adding module 120 to the information distributing apparatus 130.

The information distributing apparatus 130 includes a receiving module 132, a deleting condition deleting module 134, an information storing module 136, an information deleting module 138, and a transmitting module 140. The information distributing apparatus 130 is connected to the information collecting apparatus 110 via the communication line 129 and is connected to the information processing terminal 150 via a communication line 149.

The receiving module 132 receives information transmitted by the transmitting module 122 of the information collecting apparatus 110.

The deleting condition deleting module 134 is connected to the information storing module 136. The information received by the receiving module 132 includes at least two deleting conditions added thereto. The deleting condition deleting module 134 processes the information into first information, in which the second deleting condition to be applied to the information processing terminal 150 is deleted, and second information, in which the first deleting condition to be applied to the information distributing apparatus 130 is deleted. That is, in the first information, the first deleting condition is added to the information collected by the information collecting module 112. In the second information, the second deleting condition is added to the information collected by the information collecting module 112. The first information is stored by the information storing module 136, and the second information is transmitted to the information processing terminal 150.

In the case where the second deleting condition is "the same period as the information distributing apparatus 130", the deleting condition deleting module 134 notifies the information processing terminal 150 that deletion has been made by the information distributing apparatus 130. Thus, in the case where it is determined that the second deleting condition is "the same period as the information distributing apparatus 130", at the time of generation of the first information, in which the second deleting condition is deleted, an instruction "in the case where the first deleting condition is satisfied (or the information has been deleted by the information distributing apparatus 130), notify the information processing terminal 150 of the satisfaction of the first deleting condition (or the deletion of the information)" is added to the first deleting condition. In the case where the first deleting condition contains such an instruction, the information distributing apparatus 130 notifies the information processing terminal 150 that deletion has been made in the information distributing apparatus 130.

The information storing module 136 is connected to the deleting condition deleting module 134 and the information deleting module 138. The information storing module 136 stores the information received by the receiving module 132 (information in which the first deleting condition and the second deleting condition are added to the information collected by the information collecting module 112). The information storing module 136 may store the first information processed by the deleting condition deleting module 134.

The information deleting module 138 is connected to the information storing module 136. On the basis of the first deleting condition included in the information stored in the information storing module 136, the information deleting module 138 deletes the information from the information storing module 136. The information deleting module 138 may delete, on the basis of the first deleting condition included in the first information stored in the information storing module 136, the first information from the information storing module 136. In the case where the first deleting condition contains an instruction "in the case where the first deleting condition is satisfied (or the information has been deleted by the information distributing apparatus 130), notify the information processing terminal 150 of the satisfaction of the first deleting condition (or the deletion of the information)", the information deleting module 138 notifies the information processing terminal 150 of the satisfaction of the first deleting condition (or the deletion of the information), in accordance with the instruction.

For example, in the case where the first deleting condition is "after the arrival of a visit report", after the machine of the customer is repaired, a "visit report" reporting a repair result is transmitted from the information processing terminal 150 and received by the information collecting apparatus 110 (or a server or the like that manages a "visit report"). The information collecting apparatus 110 or the like notifies the information distributing apparatus 130 of the reception of the visit report. When receiving the report, the information deleting module 138 deletes corresponding information from the information storing module 136.

In the case where the first deleting condition is "until the reception (or transmission) of the next version", the information deleting module 138 compares the version of the instruction manual in the information storing module 136 with the version of the received (or transmitted) instruction manual. If the version is updated, the information deleting module 138 deletes the older instruction manual in the information storing module 136.

In the case where the first deleting condition is "after the transfer to the information processing terminal 150", after the information is transferred to the information processing terminal 150, the information deleting module 138 deletes the corresponding information in the information storing module 136.

In the case where the first deleting condition is "one month after transfer", the transfer time (the year, hour, minute, second, etc. as well as the month and date may be included) of the information is stored. If it is determined that one month or more has passed since the transfer time, the information deleting module 138 deletes the corresponding information in the information storing module 136.

In the case where the first deleting condition is "12. 1. 2011", if it is determined that the present date is "12. 1. 2011", the information deleting module 138 deletes the corresponding information in the information storing module 136.

In the case where the first deleting condition is "until the reception of a deleting instruction", if a "deleting instruction" has been received from the information collecting apparatus

110 or the like, the information deleting module 138 deletes the corresponding information in the information storing module 136.

The transmitting module 140 transmits the information stored in the information storing module 136 to the information processing terminal 150. The transmitting module 140 may transmit the second information processed by the deleting condition deleting module 134 to the information processing terminal 150.

The information processing terminal 150 includes a receiving module 152, an information storing module 154, and an information deleting module 156. The information processing terminal 150 is connected to the information distributing apparatus 130 via the communication line 149.

The receiving module 152 is connected to the information storing module 154. The receiving module 152 receives the information transmitted by the transmitting module 140 of the information distributing apparatus 130.

The information storing module 154 is connected to the receiving module 152 and the information deleting module 156. The information storing module 154 stores the information received by the receiving module 152.

The information deleting module 156 is connected to the information storing module 154. The information deleting module 156 deletes, on the basis of the second deleting condition included in the information stored in the information storing module 154, the information from the information storing module 154.

For example, in the case where the second deleting condition is "after the transmission of a visit report", after the machine of the customer is repaired, a "visit report" reporting a repair result is transmitted from the information processing terminal 150 and received by the information collecting apparatus 110 or the like, and the information deleting module 156 deletes the corresponding information from the information storing module 154.

In the case where the second deleting condition is "the same period as the information distributing apparatus 130", if the notification of deletion is received from the information distributing apparatus 130, the information deleting module 156 deletes the corresponding information from the information storing module 154.

In the case where the second deleting condition is "after the information is displayed once", if the information is displayed on a display device of the information processing terminal 150, the information deleting module 156 deletes the corresponding information in the information storing module 154.

In the case where the second deleting condition is "one month after reception", the reception time (the year, hour, minute, second, etc. as well as the month and date may be included) of the information is stored. If it is determined that one month or more has passed since the reception time, the information deleting module 156 deletes the corresponding information in the information storing module 154.

In the case where the second deleting condition is "12. 1. 2011", if it is determined that the present date is "12. 1. 2011", the information deleting module 156 deletes the corresponding information in the information storing module 154.

Figure 2:
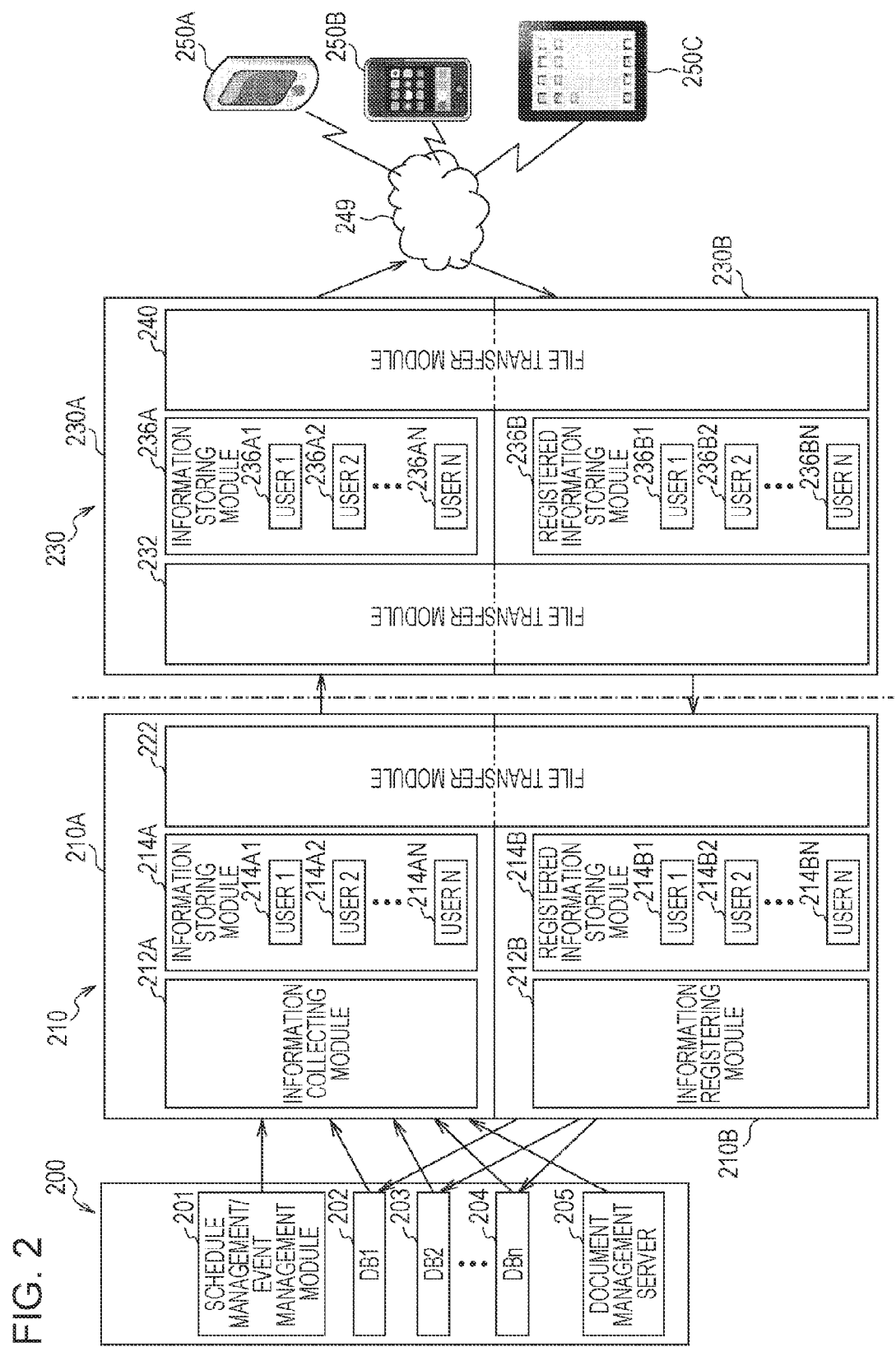
FIG. 2 is an explanatory diagram illustrating an example of the system configuration in a case where an exemplary embodiment is implemented.

FIG. 2 is an explanatory diagram illustrating an example of the system configuration in a case where an exemplary embodiment is implemented. This system includes an information providing apparatus 200, an information collecting apparatus 210, an information distributing apparatus 230, an information processing terminal 250, and the like. The information providing apparatus 200 and the information collecting apparatus 210 are apparatuses located in an intranet (inside a firewall). The information distributing apparatus 230 and the information processing terminal 250 are apparatuses located on the Internet (outside the firewall).

The information collecting apparatus 210 corresponds to the information collecting apparatus 110 illustrated in FIG. 1. The information distributing apparatus 230 corresponds to the information distributing apparatus 130 illustrated in FIG. 1. The information processing terminal 250 corresponds to the information processing terminal 150 illustrated in FIG. 1.

The information providing apparatus 200 includes a schedule management/event management module 201, a DB1 202, a DB2 203, a DBn 204, a document management server 205, and the like. These elements store information and transmit the information to the information collecting apparatus 210.

The schedule management/event management module 201 stores the schedule of an operator of the information processing terminal 250. The schedule management/event management module 201 generates an event for causing an information collecting module 212A of the information collecting apparatus 210 to collect information, in accordance with the schedule. For example, in the case where information relating to the date and time of visit to a customer A exists in the stored schedule, the schedule management/event management module 201 generates an event for causing the information collecting module 212A of the information collecting apparatus 210 to collect information on a machine located at the premises of the customer A before the scheduled date and time (the date and time a predetermined period prior to the scheduled date and time) and to transmit the collected information to the information distributing apparatus 230.

The DBs 202, 203, and 204 and the document management server 205 are DBs and a server that store information to be collected. More specifically, the DBs 202, 203, and 204 store information relating to customers (visit histories etc.), and the document management server 205 stores instruction manuals of machines.

The information collecting apparatus 210 includes an information collecting section 210A and an information collecting section 210B.

The information collecting section 210A includes the information collecting module 212A, an information storing module 214A, and a file transfer module 222. The information collecting module 212A corresponds to the information collecting module 112 illustrated in FIG. 1. The information storing module 214A corresponds to the information storing module 114, the deleting condition generating module 116, the deleting condition storing module 118, and the deleting condition adding module 120 illustrated in FIG. 1. The file transfer module 222 corresponds to the transmitting module 122 illustrated in FIG. 1. In the information storing module 214A, information is stored and managed for each operator of the information processing terminal 250.

The information collecting section 210B includes an information registering module 212B, a registered information storing module 214B, and the file transfer module 222.

The file transfer module 222 receives information transmitted from the information distributing apparatus 230. For example, the "visit report" described above and the like correspond to the information to be received from the information distributing apparatus 230.

The registered information storing module 214B stores and manages information received by the file transfer module 222 for each operator of the information processing terminal 250.

The information registering module 212B transmits information stored in the registered information storing module 214B to the DBs 202, 203, and 204, and the like and causes the information to be stored in the DBs 202, 203, and 204, and the like.

The information distributing apparatus 230 includes an information distributing section 230A and an information distributing section 230B.

The information distributing section 230A includes a file transfer module 232, an information storing module 236A, and a file transfer module 240. The file transfer module 232 corresponds to the receiving module 132 illustrated in FIG. 1. The information storing module 236A corresponds to the deleting condition deleting module 134, the information storing module 136, and the information deleting module 138 illustrated in FIG. 1. The file transfer module 240 corresponds to the transmitting module 140 illustrated in FIG. 1. The information storing module 236A stores and manages information for each operator of the information processing terminal 250.

The information distributing section 230B includes the file transfer module 232, a registered information storing module 236B, and the file transfer module 240.

The file transfer module 240 receives information transmitted from the information processing terminal 250. For example, the "visit report" described above and the like correspond to the information to be received from the information processing terminal 250.

The registered information storing module 236B stores and manages information received by the file transfer module 240 for each operator of the information processing terminal 250.

The file transfer module 232 transmits information stored in the registered information storing module 236B to the information collecting apparatus 210 and causes the information to be stored in the information collecting apparatus 210.

The information processing terminal 250 is owned by each person in charge. The information processing terminal 250 has a communication function of communicating with the information distributing apparatus 230 via a communication line 249 (for example, a wireless communication line, a cellular phone network, or the like). The information processing terminal 250 also includes a display device and a storing device. The information processing terminal 250 also has a report generating function and the like. For example, a notebook-sized personal computer having a communication function, a tablet-typed PC cellular phone (in particular, a cellular phone called a smartphone) having a communication function, or the like corresponds to the information processing terminal 250. As an operation example, before a person in charge visits the customer A in accordance with a schedule, information relating to the customer A is stored in the information processing terminal 250 owned by the person in charge. The information stored in the information processing terminal 250 is information that has been collected by the information collecting apparatus 210 from the information providing apparatus 200 and has been transferred from the information distributing apparatus 230. After the visit, the information processing terminal 250 generates a report describing a repair result etc. and transmits the generated report to the information distributing apparatus 230. The information distributing apparatus 230 transmits the received report to the information collecting apparatus 210, and the report is stored into the DB1 202 or the like in the information providing apparatus 200.

Figure 3:
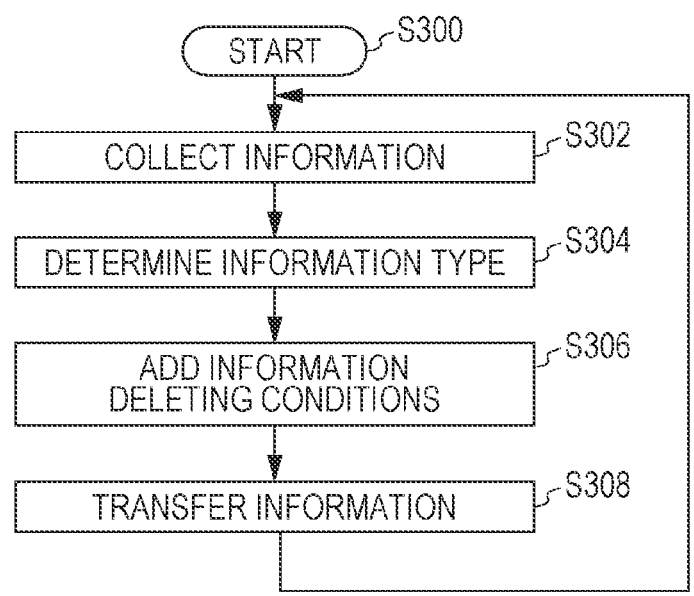
FIG. 3 is a flowchart illustrating an example of a process performed by an information collecting apparatus.

FIG. 3 is a flowchart illustrating an example of a process performed by the information collecting apparatus 110.

In step S302, the information collecting module 112 collects information.

In step S304, the deleting condition generating module 116 determines the type of the information.

In step S306, the deleting condition adding module 120 adds two or more deleting conditions to the information.

In step S308, the transmitting module 122 transfers the information including the deleting conditions added thereto.

FIG. 4 is a flowchart illustrating an example of a process performed by the information distributing apparatus 130.

In step 402, the receiving module 132 receives information.

In step S404, the deleting condition deleting module 134 processes the information. As described above, first information including a first deleting condition added thereto may be stored in the information storing module 136, and second information including a second deleting condition added thereto may be transmitted in step S406.

In step 406, the transmitting module 140 transmits the information.

In step 408, the information deleting module 138 checks if the first deleting condition is satisfied. If it is determined that the first deleting condition is satisfied, the process proceeds to step S410. If it is determined that the first deleting condition is not satisfied, the process waits until the first deleting condition is satisfied.

In step 410, the information deleting module 138 deletes the information in the information storing module 136.

FIG. 5 is a flowchart illustrating an example of a process performed by the information processing terminal 150.

In step S502, the receiving module 152 receives information.

In step S504, the information deleting module 156 checks if the second deleting condition is satisfied. If it is determined that the second deleting condition is satisfied, the process proceeds to step S506. If it is determined that the second deleting condition is not satisfied, the process waits until the second deleting condition is satisfied.

In step S506, the information deleting module 156 deletes the information in the information storing module 154.

Figure 6:
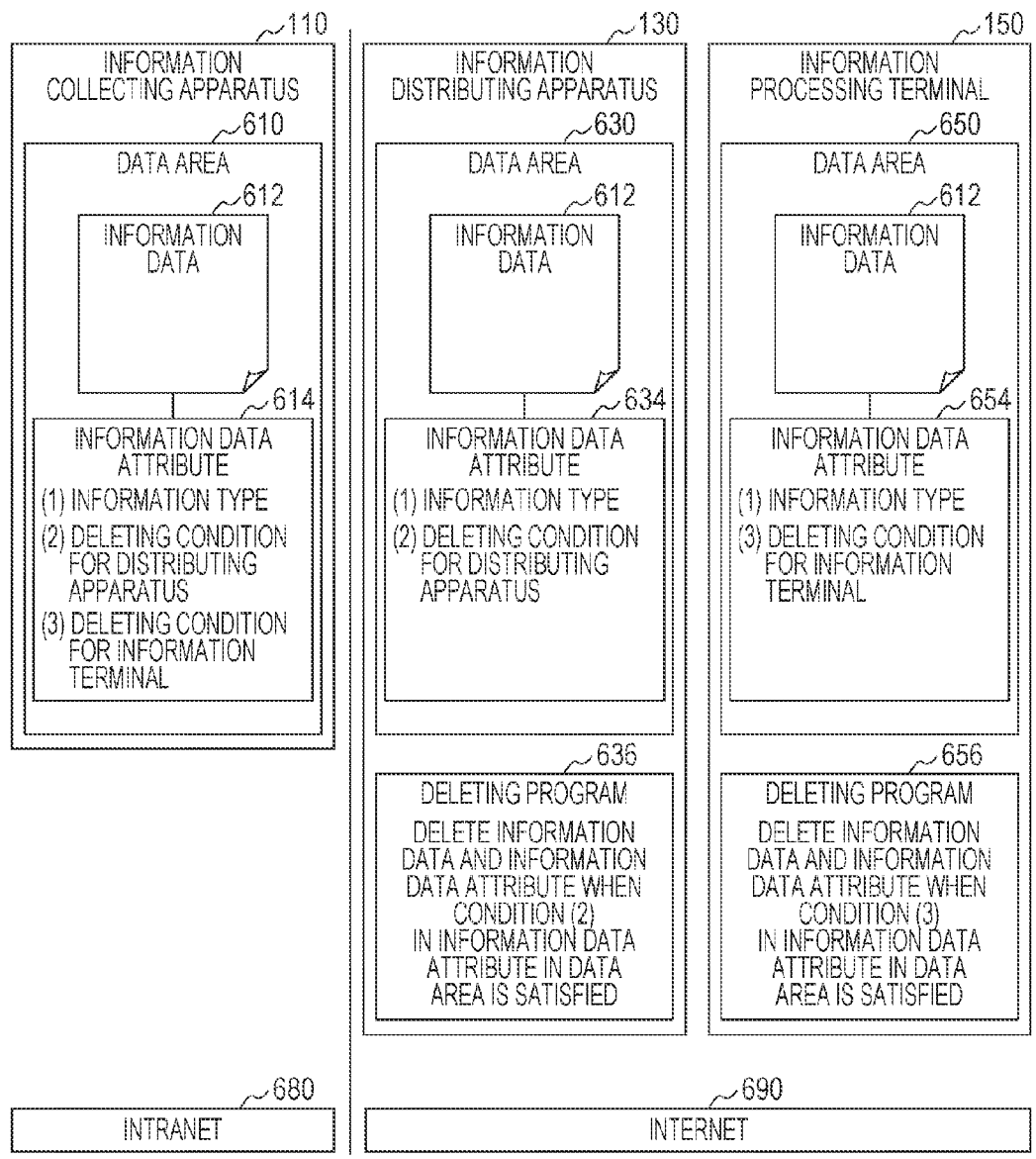
FIG. 6 is an explanatory diagram illustrating an example of the state of information in the information collecting apparatus, the information distributing apparatus, and the information processing terminal.

FIG. 6 is an explanatory diagram illustrating an example of the state of information in the information collecting apparatus 110, the information distributing apparatus 130, and the information processing terminal 150.

The information collecting apparatus 110 generates a file 610 as information. The information collecting apparatus 110 is an apparatus connected to an intranet 680.

The file 610 includes information data 612 collected by the information collecting module 112 and an information data attribute 614 as a data area. The information data attribute 614 contains the information type of the information data 612, a deleting condition for the information distributing apparatus 130, and a deleting condition for the information processing terminal 150.

In the information distributing apparatus 130, the information storing module 136 stores a file 630 as information and a deleting program 636. The information distributing apparatus 130 is an apparatus connected to the Internet 690.

The file 630 includes information data 612 and an information data attribute 634 as a data area. The information data attribute 634 contains the information type of the information data 612 and a deleting condition for the information distributing apparatus 130. The deleting program 636 is a program for performing control such that the information data 612 and the information data attribute 634 are deleted when "(2) a deleting condition for the information distributing apparatus 130" in the information data attribute 634 in the data area of the file 630 is satisfied. Although the information data attribute 634 illustrated in FIG. 6 contains "(1) information type", the information data attribute 634 might not contain "(1) information type". Furthermore, the information data attribute 634 may contain "(3) a deleting condition for the information processing terminal 150". Even in this case, the deleting program 636 deletes the information data 612 and the information data attribute 634 in accordance with "(2) a deleting condition for the information distributing apparatus 130".

In the information processing terminal 150, the information storing module 154 stores a file 650 as information and a deleting program 656. The information processing terminal 150 is an apparatus connected to the Internet 690.

The file 650 includes information data 612 and an information data attribute 654 as a data area. The information data attribute 654 contains the information type of the information data 612 and a deleting condition for the information processing terminal 150. The deleting program 656 is a program for performing control such that the information data 612 and the information data attribute 654 are deleted when "(3) a deleting condition for the information processing terminal 150" in the information data attribute 654 in the data area of the file 650 is satisfied. Although the information data attribute 654 illustrated in FIG. 6 contains "(1) information type", the information data attribute 654 might not contain "(1) information type". Furthermore, the information data attribute 634 may contain "(2) a deleting condition for the information distributing apparatus 130". Even in this case, the deleting program 656 deletes the information data 612 and the information data attribute 654 in accordance with "(3) a deleting condition for the information processing terminal 150".

Figure 8:
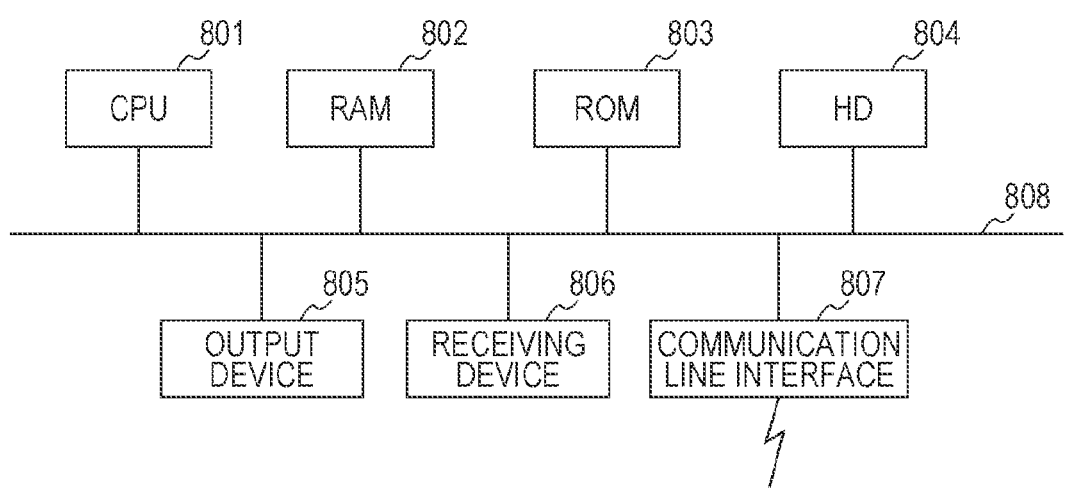
FIG. 8 is a block diagram illustrating an example of the hardware configuration of a computer that implements an exemplary embodiment.

As illustrated in FIG. 8, the hardware configuration of a computer as the information collecting apparatus 110, the information distributing apparatus 130, or the information processing terminal 150 according to an exemplary embodiment that executes a program is that of a general computer, more particularly, a computer that is capable of functioning as a personal computer, a server, or the like. That is, for example, a CPU 801 is used as a processing unit (arithmetic unit), and a RAM 802, a ROM 803, and an HD 804 are used as storing devices. The HD 804 may be, for example, a hard disk. The computer includes the CPU 801 that executes programs such as the information collecting module 112, the deleting condition generating module 116, the deleting condition adding module 120, the deleting condition deleting module 134, the information deleting module 138, the information deleting module 156, and the like, the RAM 802 that stores the programs and data, the ROM 803 that stores a program for activating the computer, the HD 804 serving as an auxiliary storing device, a receiving device 806 that receives data on the basis of a user operation for a keyboard, a mouse, a touch panel, and the like, an output device 805 such as a cathode ray tube (CRT), a liquid crystal display, or the like, a communication line interface 807 that allows connection with a communication network such as a network interface card, and a bus 808 that allows connection between the elements for data exchange. Plural such computers may be connected via a network.

Among the exemplary embodiments described above, an exemplary embodiment concerning a computer program is implemented by reading the computer program serving as software to a system having the hardware configuration and making the software cooperate with hardware resources.

The hardware configuration illustrated in FIG. 8 is merely an example. The exemplary embodiments may be configured so that the modules explained in the exemplary embodiments can be implemented. For example, some modules may be configured using dedicated hardware (for example, an application specific integrated circuit (ASIC)). Some modules may be arranged in an external system and may be connected via a communication line. In addition, the systems illustrated in FIG. 8 may be connected via communication lines so that cooperative operations can be performed. Furthermore, in particular, the system may be incorporated in a home information appliance, a copying machine, a facsimile machine, a scanner, a printer, a compound machine, or the like, besides a personal computer.

The program described above may be stored in a recording medium to be supplied or may be supplied by a communication unit. In such a case, for example, the program described above may be regarded as being an invention relating to "a computer readable recording medium in which a program is recorded".

The "computer readable recording medium in which a program is recorded" is a computer readable recording medium in which a program is recorded, where the recording medium is used for installing the program, executing the program, circulating the program, or the like.

The recording medium is, for example, a digital versatile disc-recordable (DVD-R), a DVD-rewritable (DVD-RW), a DVD-RAM, or the like, which is developed by a DVD forum, a DVD+R, a DVD+RW, or the like, which is developed by DVD+RW, a compact disc read-only memory (CD-ROM), a CD-recordable (CD-R), a CD rewritable (CD-RW), a Blu-ray disc (registered trademark), a magneto-optical disk (MO), a flexible disk (FD), a magnetic tape, a hard disk, a read-only memory (ROM), an electrically erasable programmable read-only memory (EEPROM (registered trademark)), a flash memory, a random-access memory (RAM), a secure digital (SD) memory card, or the like.

The program described above or part of the program described above may be recorded in the recording medium to be stored or circulated. In addition, the program may be transmitted via, for example, a local area network (LAN), a metropolitan area network (MAN), a wide area network (WAN), a wired or wireless network used for the Internet, intranet, extranet, or a transmission medium using the combination of some of the above-mentioned networks, or may be carried on a carrier wave.

Furthermore, the program described above may be part of a different program or may be recorded together with a different program in a recording medium. The program may be divided and recorded in plural recording media. The program may be recorded in any form as long as restoration, such as compression or encryption, can be performed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing system comprising:
a first information processing apparatus;
a second information processing apparatus; and
a third information processing apparatus,
wherein the first information processing apparatus includes a collecting unit that collects a plurality of information to be transmitted to the third information processing apparatus via the second information processing apparatus, a generating unit that generates, a first file comprising a first type of information from among the plurality of information collected by the collecting unit, an attribute specifying the first type of information and a first deleting condition, which is a condition under which the first file is to be deleted by the second information processing apparatus, and generates a second file comprising a second type of information from among the plurality of information collected by the collecting unit, an attribute specifying the second type of information and a second deleting condition, which is a condition under which the second file is to be deleted by the third information processing apparatus, and a first transmitting unit that transmits the first file and the second file generated by the generating unit to the second information processing apparatus, wherein the second information processing apparatus includes a first receiving unit that receives the first and the second file transmitted by the first transmitting unit of the first information processing apparatus, a first storing unit that stores the first and the second file received by the first receiving unit, a second transmitting unit that transmits the second file stored in the first storing unit to the third information processing apparatus, and a first deleting unit that deletes the first file from the first storing unit on the basis of the first deleting condition included in the first file stored in the first storing unit, and wherein the third information processing apparatus includes a second receiving unit that receives the second file transmitted by the second transmitting unit of the second information processing apparatus, a second storing unit that stores the second file received by the second receiving unit, and a second deleting unit that deletes the second file from the second storing unit on the basis of the second deleting condition included in the second file stored in the second storing unit.

2. An information processing apparatus comprising:

a collecting unit that collects a plurality of information to be transmitted to a third information processing apparatus via a second information processing apparatus, a generating unit that generates, a first file comprising a first type of information from among the plurality of information collected by the collecting unit, an attribute specifying the first type of information and a first deleting condition, which is a condition under which the first file is deleted by the second information processing apparatus, and generates a second file comprising a second type of information from among the plurality of information types collected by the collecting unit, an attribute specifying the second type of information and a second deleting condition, which is a condition under which the second file is deleted by the third information processing apparatus; and a transmitting unit that transmits the first file to the second information processing apparatus and the second file to third information processing apparatus via the second information processing apparatus.

3. An information processing method comprising:

collecting a plurality of information to be transmitted;

generating, a first file comprising a first type of information, an attribute specifying the first type of information and a first deleting condition corresponding to the first type of information, and a second file comprising a second type of information, an attribute specifying the second type of information, and a second deleting condition corresponding to the second type of information;

transmitting the first and the second file to a second information processing apparatus;

receiving the first and the second file at the second information processing apparatus;

storing the first file in the second information processing apparatus;

transmitting the second file to a third information processing apparatus;

deleting the first file on the basis of the first deleting condition included in the first file;

receiving the transmitted second file at the third information processing apparatus;

storing the second file in the third information processing apparatus; and deleting the second file from the third information processing apparatus on the basis of the second deleting condition included in the second file.

4. A non-transitory computer readable medium storing a program causing a computer to execute the method of claim 3.

5. A computer readable medium storing a program causing a computer to execute a process for performing information processing, the process comprising:

collecting a plurality of information types to be transmitted to a third information processing apparatus via a second information processing apparatus;

generating, a first file comprising a first type of information, an attribute specifying the first type of information and a first deleting condition corresponding to the first type of information, which is a condition under which the first type information is deleted by the second information processing apparatus, and a second file comprising a second type of information, an attribute specifying the second type of information, and a second deleting condition corresponding to the second type of information, which is a condition under which the second type information is deleted by the third information processing apparatus; and transmitting the first file to the second information processing apparatus and the second file to third information processing apparatus via the second information processing apparatus.

* * * * *